United States Patent [19]

Bell et al.

[11] Patent Number: 4,661,558

[45] Date of Patent: Apr. 28, 1987

[54] PROCESS FOR CROSSLINKING AND EXTENDING CONJUGATED DIENE-CONTAINING POLYMERS

[75] Inventors: Vernon L. Bell, Yorktown; Stephen J. Havens, Newport News, both of Va.

[73] Assignee: The United States of America as represented by the Administrator of the National Aeronautics & Space Administration, Washington, D.C.

[21] Appl. No.: 838,655

[22] Filed: Mar. 11, 1986

[51] Int. Cl.$^4$ ................................................ C08G 63/76
[52] U.S. Cl. ...................................... 525/36; 528/176; 528/184; 528/192; 528/193
[58] Field of Search ................... 525/36; 528/176, 184, 528/192, 193

[56] References Cited

U.S. PATENT DOCUMENTS 3,283,032  11/1966  Martin et al. .......................... 525/36
3,458,460  7/1969  Shepard et al. ....................... 525/36

Primary Examiner—Lucille M. Phynes
Attorney, Agent, or Firm—Wallace J. Nelson; George F. Helfrich; John R. Manning

[57] ABSTRACT

This invention relates to a process using a Diels-Alder reaction which increases the molecular weight and/or crosslinks polymers by reacting the polymers with bisunsaturated dienophiles. The polymer comprises at least 75% by weight based on the reaction product, has a molecular weight of at least 5000 and a plurality of conjugated 1,3-diene systems incorporated into the molecular structure. A dienophile reaction with the conjugated 1,3-diene of the polymer is at least 1% by weight based on the reaction product. Examples of the polymer include polyesters, polyamides, polyethers, polysulfones and copolymers thereof. The bisunsaturated dienophiles may include bis-maleimide, bisnadimides, bis maleic and bis tumaric esters and amides. The method of this invention for expanding the molecular weight chains of the polymers, preferably thermoplastics, is advantageous for processing or fabricating thermoplastics. A low molecular weight thermoplastic is converted to a high molecular weight plastic having improved strength and toughness for use in the completed end use article.

22 Claims, No Drawings

PROCESS FOR CROSSLINKING AND EXTENDING CONJUGATED DIENE-CONTAINING POLYMERS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The present invention relates to a process for improving the properties of polymers, and more specifically, of thermoplastic polymers. The well known Diels-Alder or diene reaction is utilized to extend or increase the molecular weights of the polymers and/or to crosslink or cure the thermoplastics.

Thermoplastic polymers have certain well known advantages and disadvantages relative to the thermosetting variety. Several advantages of thermoplastic polymers include better resilience or toughness, longer fatigue life and greater impact resistance. Several disadvantages of thermoplastic polymers relative to the thermosetting variety are that thermoplastic polymers are not normally cured nor crosslinked like the thermosets. In addition, the thermoplastics are usually sensitive to certain common solvents which can swell or even dissolve plastics including acetone, alcohols, hydrocarbons, methylene chloride, chloroform, and other halogenated hydrocarbons, fuels such as JP-4 jet fuel, and hydraulic fluids such as tricresyl phosphate. Furthermore, because thermoplastics are linear, they tend to creep or elongate under load at elevated temperatures greater than 50° C.

Active unsaturated compounds, such as maleimides, have been reported to bring about the crosslinking of certain unsaturated polymers, including natural rubber [P. Kovacic and R. W. Hein, J. Amer. Chem. Soc., 81, 1190 (1959)]. However, that type of free radical-induced vulcanization is, by nature, very random and slow, requiring a peroxide catalyst for the crosslinking to occur at reasonably low temperatures. And, in contrast to the invention, the peroxide-catalyzed reaction, due to its non-selective quality, cannot be used to extend or increase the molecular weights of polymers in a linear manner.

SUMMARY

This invention is directed to a process using a Diels-Alder reaction which increases the molecular weight and/or crosslinks polymers by reacting the polymers with bis-unsaturated dienophiles. The polymer comprises at least 1% by weight based on the reaction product, has a molecular weight of at least 5000 and a plurality of conjugated 1,3-diene systems incorporated into the molecular structure. A dienophile reactive with the conjugated 1,3-diene of the polymer is at least 1% by weight based on the reaction product. Examples of the polymer include polyesters, polyamides, polyethers, polysulfones and copolymers thereof. The bis-unsaturated dienophiles may include bis-maleimide, bis-nadimides, bis maleic and bis tumaric esters and amides.

The method of this invention for expanding the molecular weight chains of the polymers, preferably thermoplastics, is advantageous for processing or fabricating thermoplastics. For instance, when molding or laminating the thermoplastics of this invention, the low molecular weight thermoplastics have improved flow in the melt relative to the high molecular weight thermoplastics. Therefore, molding and laminating operations can be done at the low molecular weight stage. After the preliminary operations such as molding and laminating, have been completed, the processing temperature can be increased from about 100° C. to about 250° C. allowing the Diels-Alder chain extension to occur. Thus, the low molecular weight thermoplastic is converted to a high molecular weight plastic having improved strength and toughness for use in the completed end use article.

An additional advantage of the process of the invention is the absence of volatiles which are released during the Diels-Alder crosslinking/chain extension cure reaction.

DETAILED DESCRIPTION

The well known Diels-Alder reaction is utilized for crosslinking (i.e., curing) and/or extending conjugated diene-containing polymers by reacting the polymers with bis-unsaturated dienophiles resulting in improvements in the polymer properties.

The types of thermoplastics which can be used in this invention are many and varied. While the examples cited herein use polyesters, the method can be applied to polyamides, polyethers, polysulfones, and combinations thereof. The inherent viscosity of the polymers ranges from about 0.2 to 1.5, and preferably from about 0.5 to 1.0, as measured at 30° C. on a solution of 0.1 gram of polymer in 10 ml of chloroform. Polymers with molecular weights ranging from 10,000 to 30,000 are most often used.

The bis-unsaturated agent (i.e., the dienophile) which crosslinks two dienic polymer chains together includes the bis(dieneophiles) of U.S. Pat. No. 3,846,387 in columns 7-9 which is hereby incorporated by reference. Preferably, the dienophile is bismaleimide, or may include other bis-olefinic reagents such as bis-nadimides, and bis-maleic and bis-fumaric esters and amides. The bisunsaturated dienophiles range in molecular weight from about 200 to 1000.

Curing or crosslinking thermoplastic polymers using a Diels-Alder reaction is accomplished by synthesizing linear, thermoplastic polymers having from 1% to 50% and preferably from 1% to 15% of conjugated 1,3-diene systems by weight of polymer incorporated into the molecular structures of the polymers. The diene groups in the polymer chains are reacted with quantities of bis-unsaturated dienophiles ranging from 2% to 25% by weight of reacted material. Therefore, the weight ratio of 1,3-diene containing polymer to dienophile ranges from 3.5 to 50 and preferably from 20 to 40. The result is that the bis-olefins have a strong tendency to react with the 1,3-dienes to give a six-membered ring system.

The crosslinking reaction can be represented in a general manner as follows:

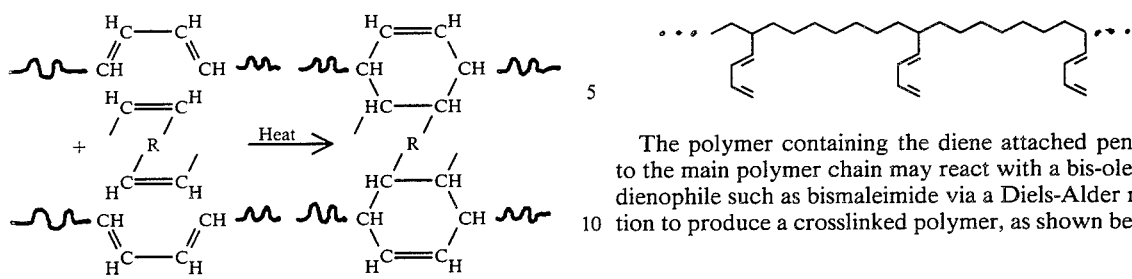

A reaction using copolyesters of adipic acid and trans, trans(t,t)-muconic acid reacted with 4-4'-isopropylidenediphenol (bisphenol A), has the conjugated 1,3-diene unsaturation incorporated into the main molecular chain of the polymer and can be represented as follows:

The polymer containing the diene attached pendant to the main polymer chain may react with a bis-olefinic dienophile such as bismaleimide via a Diels-Alder reaction to produce a crosslinked polymer, as shown below:

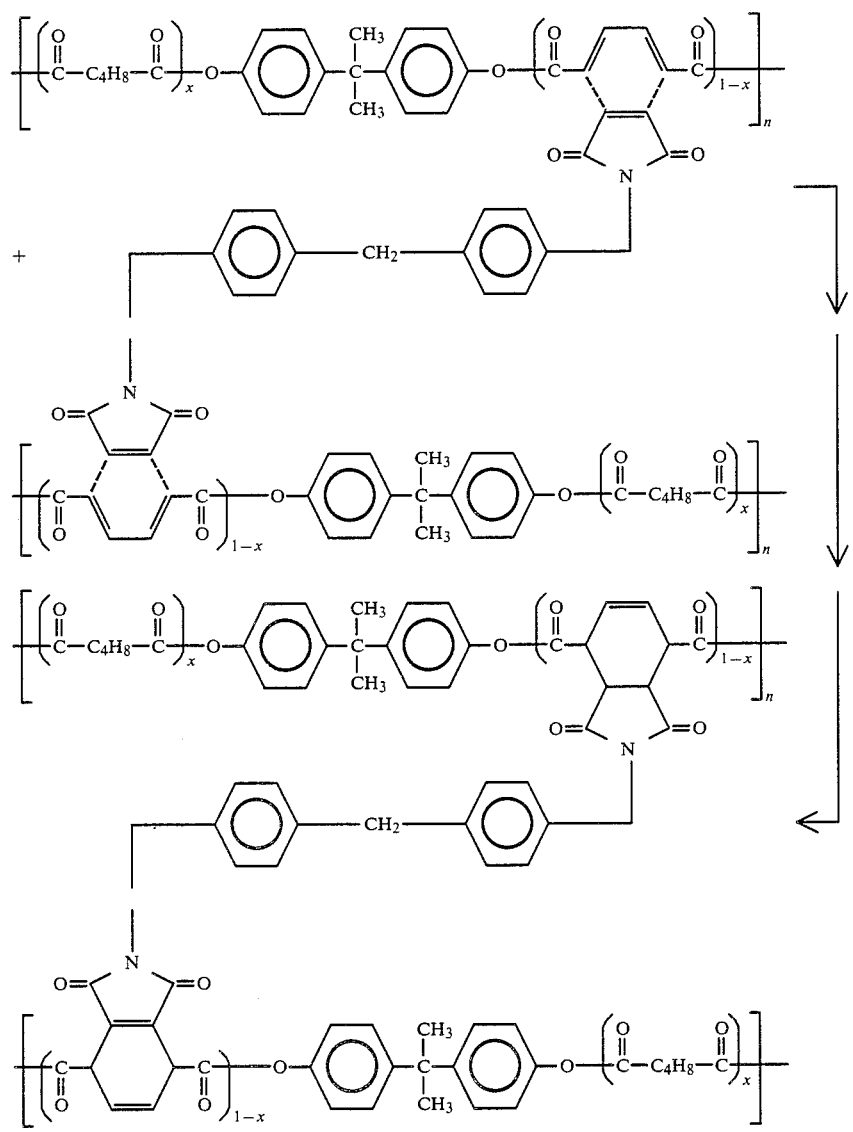

In addition, suitable polymers including polyolefins, polyesters, polyamides, polyethers, polysulfane and copolymers thereof may be synthesized which have a diene attached pendant to the main polymer chain:

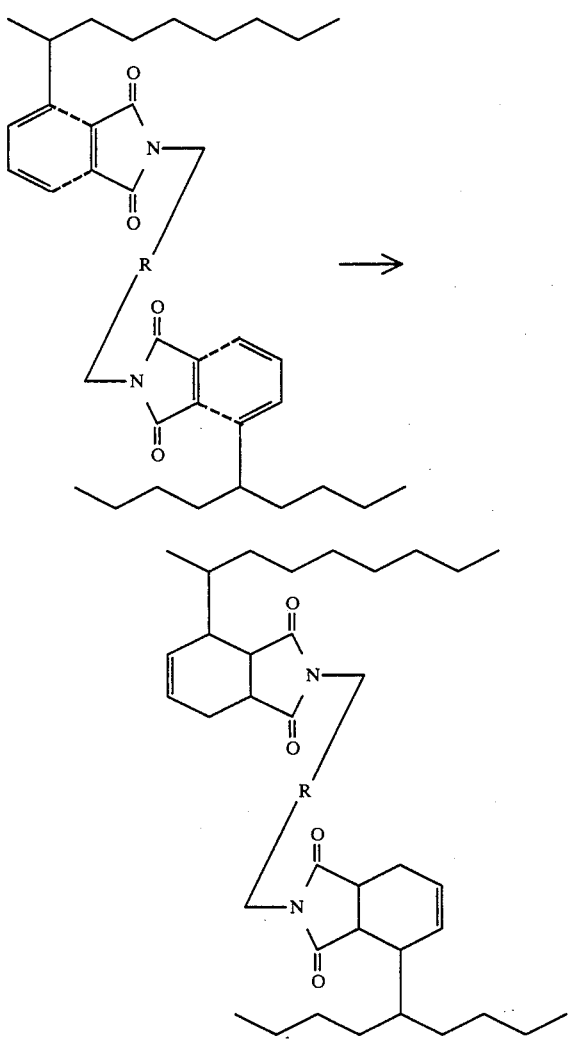

The reaction shown above may proceed more readily in some cases for example, when bulky or deactivating groups such as methyl, phenyl, or halogen are present on the polymer chain than when the diene is contained within the main polymer chain where it may be sterically hindered.

The quantities of diene groups required for cross-linking the polymers may be varied from very low concentrations to very high, for instance, 2% to 50% by weight of polymer, depending upon the degree of cross-linking that is desired. Low concentrations of dienes require longer reaction times with the bis-dienophiles and result in lightly crosslinked polymers which, though insoluble in solvents, might still be swollen by certain solvents. Polymers which incorporate high concentrations, for instance, 25% to 50% by weight of polymer of diene groups in their chemical structures will crosslink more rapidly and give more rigid cross-linked materials due to the high density of crosslinks. The highly crosslinked polymers will also have a much greater resistance to solvents than those crosslinked only lightly.

The process of the present invention can also be used to extend or build up the molecular weights of low molecular weight polymers. Thus, low molecular weight, about 2000 to 10,000 linear polymers such as polyesters, polyamides, polyethers, polysulfones and copolymers thereof, may be extended by synthesizing the polymers with terminal conjugated dienic groups. When these relatively short polymer molecules are reacted with a bis-saturated dienophile, such as a bis-maleimide, the short polymers are joined together to form much longer molecules. In contrast to the crosslinking of polymers which leads to a less linear, more planar chemical structure with more rigid (higher modulus, lower elongation) properties, the chain extension of low molecular weight, short polymer chains generally leads to more flexible, stronger and tougher polymers since the linearity of the extended polymer molecules has not only been preserved, but even enhanced.

The chain extension reaction is represented as follows:

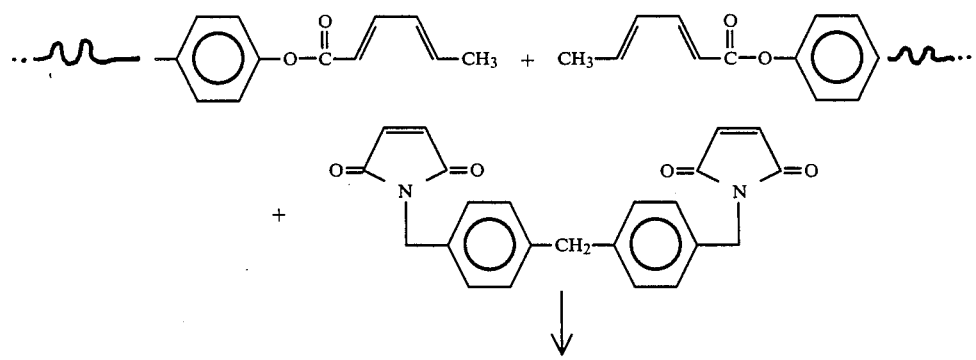

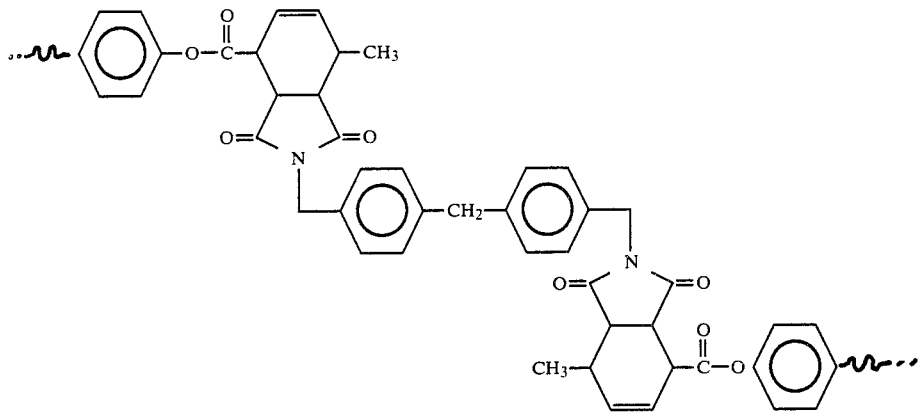

-continued

The method of this invention for expanding the molecular chains of thermoplastics is advantageous from a processing or fabricating standpoint. When molding or laminating the thermoplastics of this invention, the low molecular weight or short chain form of thermoplastics has better flow in the melt than the high molecular weight types, so that molding and laminating operations can be done at the low molecular weight stage. After the preliminary operation has been completed, the processing temperature can be increased, causing the Diels-Alder chain extension to occur, and resulting in conversion to the high molecular weight plastic which has better strength and toughness for the completed end use article. Another advantage to this process lies in the absence of volatiles release during the Diels-Alder crosslinking/chain extension cure reaction, because the Diels-Alder reaction, a 4+2 cycloaddition, occurs without the formation of any small molecules as a by-product. For example, the incorporation of a biphenyl-2,2'-diphenylethynyl unit in a polymer backbone has been used by F. E. Arnold and F. L. Hedberg, U.S. Pat. No. 3,876,614 to cure the polymer at high temperatures without the liberation of gaseous side products.

The invention will be further illustrated, but is not intended to be limited, by the following examples:

EXAMPLE I

A copolyester containing 50 mole percent of adipic acid ester groups and 50 mole percent of trans,trans-(t,t-) muconic acid ester groups was synthesized by reacting equimolar quantities of the diacid chlorides of adipic and t,t-muconic acid with two molar quantities of 4,4'-isopropylidenediphenol (bisphenol A), using the interfacial polycondensation technique (Condensation Polymers: by Interfacial and Solution Methods, Paul W. Morgan, Interscience Publishers, 1965, New York). To a solution of 0.978 g (0.003 moles) of this polymer (containing 0.0015 equivalents of t,t-conjugated diene groups) in 12 ml of 1,2-dichloroethane (DCE) was added 0.270 g (0.00075 moles) of N,N'bis-maleimido-4,4'-diphenylmethane (4,4'-MDA.BMI). That quantity of 4,4'-MDA.BMI theoretically was sufficient to react by the Diels-Alder mechanism with all of the conjugated diene groups in the copolyester.

A thin film of the polymer and maleimide mixture was cast onto a glass plate and dried overnight at room temperature. A portion of the clear, dry film was stripped from the glass plate and dried overnight at room temperature after which time the film was still soluble in DCE. This indicated that no significant crosslinking had occurred. The rest of the film was heated for 1 hour under vacuum (less than 1 millimeter pressure) at 160° C., which is at the melting point of the 4,4'-MDA.BMI (158°–160° C.) and far above the glass transition temperature (softening temperature) of the copolyester (100° C. or less). After that thermal treatment, the copolyester film had become completely insoluble and unswollen when immersed in DCE, thus proving that crosslinking had occurred.

EXAMPLE II

The Diels-Alder crosslinking reaction was conducted on a copolyester of 75 mole percent of adipic acid and 25 mole percent of t,t-muconic acid reacted by interfacial condensation with bisphenol A. The copolyester solution was prepared by dissolving 1.011 g (0.003 moles) of the copolymer (containing 0.00075 equivalents of t,t-conjugated diene groups) in 8 ml of toluene, 1 ml of 1,1,2,2-tetrachloroethane (TCE) and 2 ml of DCE. In this example, which employed only half the number of conjugated diene groups as in Example I, only 0.0358 g (0.0001 moles) of 4,4'-MDA.BMI was dissolved in the polymer solution. That quantity theoretically should have been sufficient to react with a maximum of 26.7% of the conjugated diene groups in the polymer.

The polymer and bismaleimide solution was cast onto a glass plate and spread with a 17 mil doctor blade gap to give a thin film which was dried in air at room temperature and then at 1 mm pressure for 17 hours. The film was removed from the glass plate and divided into two parts. One-half was placed on a metal frame and heated under vacuum (less than 1 mm pressure) at 160° C. for 1 hour. The heated film was no longer soluble or even swollen when placed in toluene or dichloroethane, proving that the 4,4'-MDA.BMI had crosslinked the copolyester under the influence of heat. However, the unheated film was still very soluble in both toluene and 1,2-dichloroethane.

The effect of the crosslinking on the thermomechanical nature of the copolyester was shown by loading samples of the unheated and heated films on a Thermomechanical Analyzer (TMA). The unheated, uncrosslinked film had a glass transition (softening) temperature (Tg) of 77° C., while the heated, crosslinked film displayed a Tg=122° C., indicating the rigidization which is so typical of crosslinking.

EXAMPLE III

The Diels-Alder reaction for crosslinking was applied to a copolyester containing even fewer conjugated diene groups than the polymers of Examples I and II. Poly[4,4'isopropylidenediphenyl coadipate/t,t-muconate (85.15)] (1.350 g, 0.004 moles), containing 0.0006 moles or equivalents of conjugated diene groups, was dissolved in 10 ml of toluene and 3 ml of 1,2-dichloroethane. A small sample of the polymer was cast onto a glass plate and dried at room temperature under vacuum to give a control copolyester (no maleimide crosslinking agent present). To the rest of the solution was added 0.0358 g (0.0001 moles) of 4,4'-MDA.BMI, which was theoretically sufficient to react with one-third of the conjugated diene groups in the polymer. The polymer and maleimide solution was centrifuged and then spread onto a glass plate with a 17 mil doctor blade gap. The control polyester film and the film of the mixture were dried in air at room temperature, then for 6 hours in a vacuum oven (1 mm) at room temperature, and then under vacuum for 2 hours at 50° C. At this stage, both the control and mixture films were still soluble in toluene and DCE, indicating crosslinking had not occurred. The film from the mixture of the polyester and bismaleimide was stripped from the glass plate and divided into halves, one of which was dried in vacuo at room temperature for 17 hours, while the other half was heated at 100° C. on a metal frame, under vacuum (1 mm) for 1 hour. After that treatment, the heated film was completely insoluble in DCE, toluene, or chloroform, indicating it had been crosslinked by the reaction of the copolyester, containing only 15% conjugated diene groups, with the bismaleimide. The glass transition, or softening temperature of this film was 91° C., compared to the unheated, soluble copolyester-bismaleimide film, which had Tgs of 83° C. and 86° C., in two measurements. This was further proof that Diels-Alder induced crosslinking had occurred.

EXAMPLE IV

Another experiment was carried out using the same polymer, a 75/25 adipate/muconate-bisphenol A copolyester, and the same amount of bismaleimide as was used in Example II. Thermogravimetric analyses of four films from the experiment showed the following results:

| Film Type | Heat Treatment | Tg | Soluble in DEC |
|---|---|---|---|
| Copolyester + 4,4'-MDA.BMI | None | 70° C. | Yes |
| Copolyester + 4,4'-MDA.BMI | 100° C./1 hr. | 118° C. | No |
| Copolyester only | None | 90° C. | Yes |
| Copolyester only | 100° C./1 hr. | 92° C. | No |

This experiment indicates that the 4,4'-MDA.BMI cross-links the copolyester most effectively, since it increased the Tg to 118° C. The copolyester control sample alone apparently was crosslinked by heating to 100° C. (by virtue of the diene groups reacting with each other) since it did become insoluble. However, the minimal increase in Tg of only 2° C. probably indicates the crosslinking was very random, and cyclohexenyl groups, which probably are responsible for the substantial Tg (48° C.) as a result of Diels-Alder crosslinking when bismaleimides are present, were not formed in the control polyester film to any significant extent.

EXAMPLE V

The usefulness of our invention for building up the molecular weight, and thus increasing the quality of polymers, was demonstrated by this experiment which used the conjugated diene-bismaleimide Diels-Alder reaction to build up a low molecular weight aromatic polyester.

A low molecular weight aromatic polyester, with an average molecular weight of 10,000 (a degree of polymerization of 47.57) was prepared by reacting 7.3288 g (0.02500 moles) of 3,3'-methylenedibenzoyl dichloride with 5.2303 g (0.02612 moles) of 4,4'-methylene diphenol in 67 ml of methylene chloride and 8.00 ml (0.0575 moles) of triethylamine. The pink-colored solution was allowed to stir overnight at room temperature, during which time triethylammonium chloride salt precipitated from solution. The addition of the polymer solution to methanol, stirred rapidly in a blender, precipitated white polymer, which was washed in the blender successively with water and methanol, after which it was dried at 90° C. The yield of hydroxylterminated polymer (because of the excess of 4,4'-methylene diphenol) was virtually quantitative, and the inherent viscosity, at a concentration of 0.5% in chloroform at 25° C. was 0.28. A film cast from this polymer dissolved in 1,2-dichloroethane was extremely brittle, which confirmed the low molecular weight of this hydroxy-terminated polymer.

The above hydroxy-terminated polymer was converted to a low molecular weight polyester with terminal conjugated 2,4-diene groups by slowly adding a solution of 0.269 g (0.0020 moles) of 2,4-hexadienoyl chloride in 5 ml of 1,2dichloroethane to a stirred solution of 5.00 g (0.00050 moles) of the polymer dissolved in 25 ml of 1,2-dichloroethane containing 0.70 ml (0.0050 moles) of triethylamine. The resulting reaction mixture was stirred at room temperature for 3 hours, after which it was added to methanol in a blender, precipitating the polymer. The 2,4-diene-terminated polymer was collected by filtration and washed successively with water and methanol, and then dried at 90° C. A yield of 4.94 g (97%) of polymer was obtained, having once again an inherent viscosity (0.5%, chloroform, 25° C.) of 0.28. When a solution of this polymer in 1,2-dichloroethane was cast onto a glass plate, and heated to 120° C., the resulting film was still brittle.

The chain extension reaction was conducted by mixing 1.00 g (0.0001 moles) of the above low molecular weight, conjugated diene-terminated polymer and 0.0358 g, (0.0001 moles) of N,N'-bismaleimido-4,4'-diphenylmethane in 5 ml of DCE, and casting the resulting solution onto a glass plate. The film was dried first in air, then at 120° C. under vacuum (less than 1 mm) at 120° C. After that thermal treatment, the resulting film was tough and flexible, indicating that the chain extension Diels-Alder reaction had increased the molecular weight of the polyester in a linear fashion, resulting in the improvement of the mechanical properties of the polymer.

It is evident from the foregoing that various modifications can be made to this invention, but such modifications are considered to be within the scope of this invention.

What is claimed is:

1. A process for improving the properties of a polymer using a Diels-Alder reaction which comprises reacting:

(a) a polymer selected from the group consisting of polyesters, polyamides, polyethers, polysulfones and copolymers thereof having a plurality of conjugated 1,3-diene systems incorporated into the molecular structure of the polymers, said polymer having a molecular weight of at least 5000; and (b) at least 1% by weight based on the weight of the polymer of a bis-unsaturated dienophile which is reactive with the conjugated 1,3-dienes of the polymer.

2. The process according to claim 1, wherein the molecular weight of the polymer is increased.

3. The process according to claim 1, wherein the polymer is crosslinked.

4. The process according to claim 1, wherein the molecular weight is increased and the polymer is crosslinked.

5. The process according to claim 1, wherein the dienophile is selected from the group consisting of bis-maleimides, bis-nadimides, bis-maleic and bis-fumaric esters and amides.

6. The process according to claim 1, wherein the polyester is a copolyester containing about 50 percent of adipic acid ester groups and about 50 mole percent of trans,trans(t,t)-muconic acid ester groups synthesized by reacting equimolar quantities of diacid chlorides of adipic and t,t-muconic acid with two molar quantities of bisphenol A.

7. The process according to claim 1, wherein the dienophile is N,N'-bis-maleimido-4,4'-diphenylmethane.

8. The process according to claim 1, wherein the polyester is a copolyester comprising about 75 mole percent of adipic acid and 25 mole percent of t,t-muconic acid reacted by interfacial condensation with bisphenol A.

9. The process according to claim 7, wherein a quantity of N,N'-bis-maleimido-4,4'-diphenylmethane reacts with all conjugated diene groups in the polyester.

10. The process according to claim 9, which comprises forming a solution containing a copolyester having t-t,conjugated diene groups dissolved in 1,2-dichloroethane and adding to the solution N,N'-bis-maleimido-4,4'-diphenylmethane.

11. The process according to claim 7, wherein a quantity of N,N'-bis-maleimido-4,4'-diphenylmethane reacts with at most about 27% of the conjugated diene groups in the polymer.

12. The process according to claim 11, wherein a polymer solution containing a copolymer having t,t-conjugated diene groups dissolved in toluene, 1,1,2,2,-tetrachloroethane and 1,2-dichloroethane is reacted with N,N'-bis-maleimido-4,4'-diphenylmethane.

13. The process according to claim 7, wherein a quantity of N,N'-bis-maleimido-4,4'-diphenylmethane reacts with about one-third of the conjugated diene groups in the polymer.

14. The process according to claim 13, which comprises reacting a copolymer poly (4,4'-isopropylidenediphenyl coadipate/t,t-mucanate (85/15)) solution having conjugated diene groups dissolved in toluene and 1,2-dichloroethane with N,N'-bis-maleimido-4,4'-diphenylmethane.

15. The process according to claim 1, wherein substantially no volatiles are released.

16. A low molecular weight aromatic polyester with an average molecular weight of about 10,000 and a degree of polymerization of about 48, produced according to the process of claim 1 by reacting 3,3'-methylenedibenzoyl dichloride with 4,4'-methylene diphenol in methylene chloride and triethylamine.

17. A product produced by the process of claim 1.

18. The process according to claim 1, wherein the weight ratio of the 1,3-diene containing polymer to dienophile ranges from 3.5 to 50.

19. A process using a Diels-Alder reaction which comprises reacting:

(a) at least 1% by weight based on a reaction product of polymers having a molecular weight of at least 5000 and a plurality of conjugated 1,3-diene systems incorporated into the molecular structure, said polymer is selected from the group consisting of polyesters, polyamides, polyethers, polysulfones and copolymers thereof; and (b) at least 1% by weight based on the reaction product of a dienophile reactive with the conjugated 1,3-dienes of the polymer, said dienophile is selected from the group consisting of bismaleimide, bis-nadimides, bis-maleic and bis-tumaric esters and amides.

20. The process according to claim 19, wherein the molecular weight of the polymer is increased.

21. The process according to claim 19, wherein the polymer is crosslinked.

22. The process according to claim 19, wherein the molecular weight is increased and the polymer is crosslinked.

* * * * *